United States Patent
Imamura

(10) Patent No.: US 9,557,629 B2
(45) Date of Patent: *Jan. 31, 2017

(54) INTERCHANGEABLE LENS CAMERA, CAMERA BODY, LENS UNIT, AND BUSY SIGNAL CONTROL METHOD

(71) Applicant: FUJIFILM Corporation, Tokyo (JP)

(72) Inventor: Kenshi Imamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 90 days.

This patent is subject to a terminal disclaimer.

(21) Appl. No.: 14/611,469

(22) Filed: Feb. 2, 2015

(65) Prior Publication Data

US 2015/0146088 A1 May 28, 2015

Related U.S. Application Data

(63) Continuation of application No. 14/311,795, filed on Jun. 23, 2014, now Pat. No. 9,041,855, which is a (Continued)

(30) Foreign Application Priority Data

Dec. 28, 2011 (JP) .................................. 2011-289517

(51) Int. Cl.
*H04N 5/225* (2006.01)
*G03B 19/12* (2006.01)
(Continued)

(52) U.S. Cl.
CPC ............... *G03B 17/18* (2013.01); *G03B 13/34* (2013.01); *G03B 13/36* (2013.01); *G03B 17/14* (2013.01);
(Continued)

(58) Field of Classification Search
CPC ............ H04N 5/23209; H04N 5/23212; H04N 5/23225; G03B 13/34; G03B 13/36; G03B 17/14; G03B 17/18; G03B 2206/00
See application file for complete search history.

(56) References Cited

U.S. PATENT DOCUMENTS 6,339,510 B1 * 1/2002 Taniguchi .............. G02B 7/282
359/698
8,616,790 B2 * 12/2013 Osawa .................. G03B 17/14
396/529
(Continued)

FOREIGN PATENT DOCUMENTS

JP 2-149073 A 6/1990
JP 6-3582 A 1/1994
(Continued)

OTHER PUBLICATIONS

International Preliminary Report on Patentability for PCT/JP2012/082029 completed on Oct. 23, 2013.
(Continued)

*Primary Examiner* — Aung S Moe
*Assistant Examiner* — John H Morehead, III
(74) *Attorney, Agent, or Firm* — Birch, Stewart, Kolasch & Birch, LLP

(57) ABSTRACT

An aspect of the present invention provides an interchangeable lens camera having a camera body and a lens unit that is freely attachable and detachable to the camera body. In the interchangeable lens camera, a communications unit in the camera body sends via communications terminals (MT_MOSI and MT_MISO) an INTR_BUSY control instruction that instructs whether to make notification with a busy signal (INTR_BUSY signal) for any operation out of a plurality of types of operations that can be executed, and the lens unit or camera body communications unit sets the busy signal (INTR_BUSY) to an ON state (low level) only during the period of operation of the type indicated by the INTR_BUSY control instruction.

10 Claims, 7 Drawing Sheets

Related U.S. Application Data continuation of application No. PCT/JP2012/082029, filed on Dec. 11, 2012.

(51) Int. Cl.
    *G03B 17/00*     (2006.01)
    *G03B 17/18*     (2006.01)
    *G03B 17/14*     (2006.01)
    *H04N 5/232*     (2006.01)
    *G03B 13/36*     (2006.01)
    *G03B 13/34*     (2006.01)

(52) U.S. Cl.
    CPC ...... *H04N 5/23209* (2013.01); *H04N 5/23212* (2013.01); *H04N 5/23225* (2013.01); *G03B 2206/00* (2013.01)

(56) References Cited

U.S. PATENT DOCUMENTS

| | | | |
|---|---|---|---|
| 2004/0177215 A1* | 9/2004 | Nagamasa | G06F 21/602 |
| | | | 711/103 |
| 2009/0085434 A1 | 4/2009 | Ishii et al. | |
| 2010/0128143 A1* | 5/2010 | Ohtsubo | H04N 5/232 |
| | | | 348/229.1 |
| 2011/0170853 A1* | 7/2011 | Osawa | G03B 17/14 |
| | | | 396/529 |
| 2012/0155853 A1* | 6/2012 | Osawa | G03B 17/14 |
| | | | 396/529 |

FOREIGN PATENT DOCUMENTS

| | | |
|---|---|---|
| JP | 2003-202623 A | 7/2003 |
| JP | 2004-48360 A | 2/2004 |
| JP | 2009-89467 A | 4/2009 |
| JP | 2009-246906 A | 10/2009 |

OTHER PUBLICATIONS

International Search Report for PCT/JP2012/082029 mailed on Feb. 19, 2013.

Notice of Allowability mailed Oct. 6, 2014 in U.S. Appl. No. 14/311,795.

Written Opinion of the International Searching Authority for PCT/JP2012/082029 mailed on Feb. 19, 2013.

* cited by examiner

INTERCHANGEABLE LENS CAMERA, CAMERA BODY, LENS UNIT, AND BUSY SIGNAL CONTROL METHOD

CROSS-REFERENCE TO RELATED APPLICATIONS

This application is a Continuation of copending application Ser. No. 14/311,795, filed Jun. 23, 2014, which is a Continuation of PCT Application No. PCT/JP2012/082029 filed on Dec. 11, 2012 which claims the priority under 35 U.S.C. §119(a) to Japanese Patent Application No. 2011-289517, filed in Japan on Dec. 28, 2011, all of which are hereby expressly incorporated by reference into the present application.

BACKGROUND OF THE INVENTION

Field of the Invention

The present invention relates to an interchangeable lens camera with an interchangeable lens unit having a taking lens, a camera body, the lens unit, and a busy signal control method.

Description of the Related Art

Interchangeable lens cameras including a camera body to and from which a lens unit with a taking lens is attachable and detachable have been widely available. General examples of an interchangeable lens camera are a single-lens reflex camera including a reflective mirror which reflects incident light of the lens unit for introduction to an optical view finder, and a mirrorless single-lens reflex camera from which the reflective mirror is omitted. Also, in addition to an interchangeable lens camera having an image pickup device provided to the camera body, an interchangeable lens camera having an image pickup device to the lens unit has been known.

PTL 1 discloses the structure of an interchangeable lens camera with a lens unit attachable to and detachable from a camera body, where a control signal is transmitted from the camera body to the lens unit.

PTL 2 discloses the structure of an interchangeable lens camera with a lens unit (accessory) attachable to and detachable from the camera body, where a clock signal line for the lens unit to synchronize with the camera body for communication is set at a Low level, thereby notifying the camera body of a busy state.

CITATION LIST

Patent Literature

PTL 1: Japanese Patent Application Laid-Open No. 2-149073
PTL 2: Japanese Patent Application Laid-Open No. 6-3582

SUMMARY OF THE INVENTION

However, when the camera body and the lens unit each notify its counterpart of a busy state, it is difficult to efficiently confirm the busy state without wasteful communications.

PTL 1 merely discloses that a control signal is transmitted from the camera body to the lens unit. When an inquiry about a busy state and a response indicating whether the state is busy are made by using data communications as described in PTL 1, such an inquiry and response are repeated many times during a busy period, leading to wasteful communications.

Moreover, while it can be thought as described in PTL 2 that a notification of a busy state is made at a specific signal level (for example, a Low level) of a signal line, it is merely possible to fixedly notify a busy state of a predetermined specific operation. If the number of types of operation increases, a plurality of busy signal terminals are required to be provided to the camera body and the lens unit, and also the load of monitoring on a busy notification receiving side increases.

The present invention is made in view of these circumstances, and has an object of providing an interchangeable lens camera, camera body, lens unit, and busy signal control method capable of efficiently confirming a busy state without wasteful communications even if a plurality of types of operation can be performed.

The present invention provides an interchangeable lens camera including a camera body and a lens unit attachable to and detachable from the camera body, wherein each of the camera body and the lens unit includes a communication signal terminal for instruction from the camera body to the lens unit, busy signal terminals for a busy signal indicating whether now is during a period of an operation, and a communicating part which performs communications via the communication signal terminal and the busy signal terminal, the communicating part of the camera body transmits via the communication signal terminal to the lens unit a busy signal control instruction that can indicate a type of an operation that can be performed by the lens unit and indicates a type of an operation of a notification target of the busy signal, and the communicating part of the lens unit sets the busy signal to an ON state only during the operation of the type indicated by the busy signal control instruction.

According to the present invention, compared with the case in which an inquiry about a busy state and response are repeated in data communications, it is not required to repeat a busy inquiry and a response many times by using a busy signal indicating that now is during operation. Also, compared with the case in which a busy notification is made only for a predetermined fixed operation by simply using a busy signal, any type of an operation of a notification target of the busy signal is indicated by a busy signal control instruction, thereby selectively and efficiently monitoring a necessary operation only with the paired busy signal terminals provided to the camera body and the lens unit.

In an embodiment, the lens unit has a driven member and a driving part which drives the driven member, and at initial position driving of driving the driven member by the driving part to an initially set position, with the busy signal control instruction not received from the camera body, the communicating part of the lens unit sets the busy signal to an ON state during a period of the initial position driving, and sets the busy signal to an OFF state when the initial position driving ends. That is, by making a busy notification without using a busy signal control instruction normally used, the lens unit can quickly drive the driven member to the initially set position without waiting for the busy signal control instruction.

In an embodiment, the communicating unit of the lens unit retains the type of the operation indicated by the busy signal control instruction in the memory and, every time the operation of the type retained in the memory is performed, the communicating unit of the lens unit sets the busy signal corresponding to the operation of the type retained in the memory to an ON state until an operation of another type is indicated by the busy signal control instruction or until an instruction of the type of the operation indicated by the busy signal control instruction is cancelled. That is, the busy signal control instruction is not required to be transmitted for each operation, and therefore a wasteful busy signal control instruction is omitted.

In an embodiment, when operations of a plurality of types are specified by the busy signal control instruction, the communicating part of the lens unit sets the busy signal to an ON state when each of the operations of the plurality of types is started and sets the busy signal to an OFF state when each of the operations of the plurality of types ends.

In an embodiment, when operations of a plurality of types are specified by the busy signal control instruction, the communicating part of the lens unit sets the busy signal to an ON state when a first operation among the operations of the plurality of types is started and sets the busy signal to an OFF state when all of the operations end.

In an embodiment, the lens unit has driving parts which drive a zoom lens, a focus lens, and an iris, and the communicating part of the lens unit sets the busy signal to an ON state during a period of driving by any of the driving parts.

In an embodiment, when mutually transmitting the busy signal control instruction that can indicate a type of an operation that can be performed by the lens unit or the camera body and indicates a type of an operation of a notification target of the busy signal, the communicating part of the camera body transmits to the lens unit the busy signal control instruction including information indicating that a controller of the busy signal is the camera body when an operation to be performed by the camera body is selected as the notification target of the busy signal, and transmits to the lens unit the busy signal control instruction including information indicating that the controller of the busy signal is the lens unit when an operation to be performed by the lens unit is selected as the notification target of the busy signal.

In an embodiment, the camera body has an image pickup device, and the communicating part of the camera body sets the busy signal ON during an exposure period of the image pickup device.

Note in the present invention that "operation" for instruction with the busy signal control instruction is not restricted to a mechanical operation of the focus lens, the zoom lens, the iris, or the like, but may be an electrical operation such as exposure of the image pickup device, signal processing, read and write of a storage device, or the like, or a software processing operation such as a computing process.

According to the present invention, when the camera body and the lens unit each notify its counterpart that now is during a period of an operation, a busy state can be efficiently confirmed without wasteful communication.

BRIEF DESCRIPTION OF THE DRAWINGS

FIG. 6 is a timing chart of an example of change in voltage level of each terminal when a camera body is powered ON.

DETAILED DESCRIPTION OF THE EMBODIMENTS

Embodiments of the present invention are described in detail below according to the attached drawings.

Figure 1:
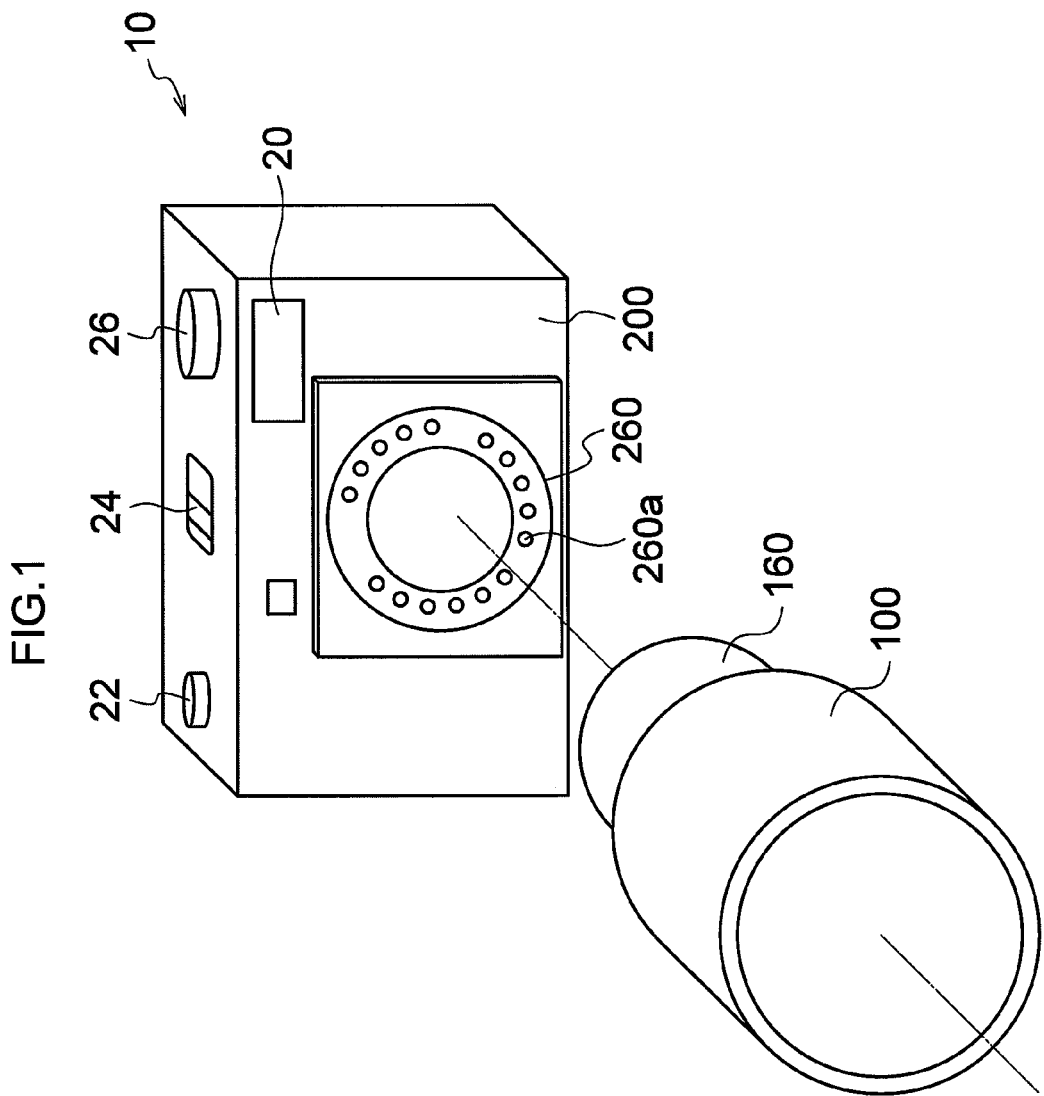
FIG. 1 is a perspective view of a front outer view of an interchangeable lens camera according to an embodiment of the present invention.

FIG. 1 is a perspective view of a front outer view of an interchangeable lens camera (hereinafter refer to a "camera") according to an embodiment of the present invention.

As depicted in FIG. 1, a camera 10 of the present embodiment includes a lens unit 100 and a camera body 200. The lens unit 100 includes a lens mount 160 (lens-side mount part) attachable to and detachable from a body mount 260 (body-side mount part), which will be described further below, of the camera body 200. The lens unit 100 of this example is in a cylindrical shape, and has the lens mount 160 formed at an end of the lens unit 100. The camera body 200 includes a body mount 260 to and from which the lens mount 160 of the lens unit 100 is attachable and detachable. The camera body 200 of this example is in a box shape, and has the body mount 260 formed approximately at the center of the front surface of the camera body 200. With the lens mount 160 of the lens unit 100 mounted on the body mount 260 of the camera body 200, the lens unit 100 is attachably and detachably mounted on the camera body 200.

The lens mount 160 and the body mount 260 are each provided with a plurality of terminals as contacts. While only terminals 260a of the body mount 260 are depicted in FIG. 1, terminals are provided also to the lens mount 160. When the lens mount 160 is mounted on the body mount 260, the terminals of the lens mount 160 and the body mount 260 abut on each other for conduction. In this example, the plurality of terminals 260a of the body mount 260 and the plurality of terminals of the lens mount 160 are provided along a circumferential direction of the lens unit 100.

On the front surface of the camera body 200, a flash 20 (built-in strobe) for radiating a subject with illumination light is provided. On the upper surface of the camera body 200, a release button 22, a power supply switch 24, and a dial 26 are provided. Also, on the back surface of the camera body 200 not depicted, a monitor (216 in FIG. 2), which will be described further below, and various buttons are provided.

The release button 22 functions as photographing instruction input means for inputting a photographing instruction, and is configured of a type of so-called two steps, "halfway press" and "full press". In the camera 10, with the release button 22 pressed halfway down, AE (Automatic Exposure) and AF (Auto Focus) are caused to function. With a full press, photographing is performed.

The power supply switch 24 is configured of a slide-type switch in this example. With a slide operation of the power supply switch 24, the camera body 200 is powered ON/OFF. Note that the power supply switch 24 is not restricted to one of a slide operation type, and the placement location is not restrictive, either. For example, the power supply switch 24 may be placed on the back surface of the camera body 200.

The dial 26 is a rotation-type operation member, and functions as means for switching the mode of the camera 10. The camera 10 can be set to a "photographing mode" in which an image of a subject is recorded by photographing the subject with a rotating operation of the dial 26 or to a "replay mode" in which the recorded image is replayed.

Figure 2:
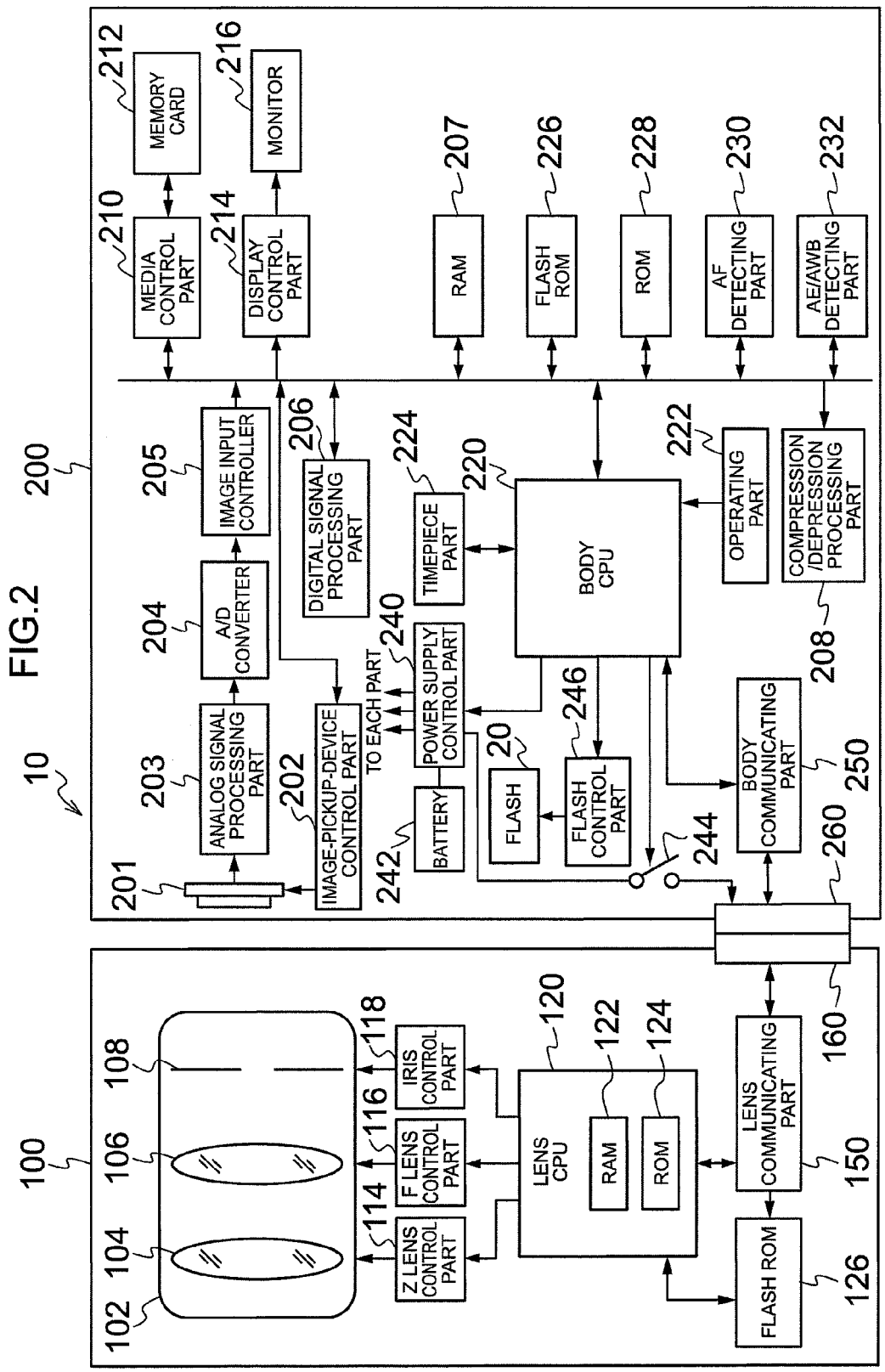
FIG. 2 is a block diagram of an entire structure of the interchangeable lens camera of FIG. 1.

FIG. 2 is a block diagram of an entire structure of the camera 10.

The lens unit 100 includes a photographing optical system 102 (a zoom lens 104, a focus lens 106, and an iris 108), a zoom lens control part 114, a focus lens control part 116, an iris control part 118, a lens CPU 120, a flash ROM 126, a lens communicating part 150 (lens-side communicating part), and the lens mount 160 (lens-side mount part).

The photographing optical system 102 has the zoom lens 104, the focus lens 106, and the iris 108. The zoom lens control part 114 controls the position of the zoom lens 104 by following an instruction from the lens CPU 120. The focus lens control part 116 controls the position of the focus lens 106 by following an instruction from the lens CPU 120. The iris control part 118 controls an opening area of the iris 108 by following an instruction from the lens CPU 120.

The lens CPU 120 is a CPU (Central Processing Unit) of the lens unit 100, and has a ROM 124 and a RAM 122 incorporated therein.

The flash ROM 126 is a non-volatile memory for storing a program or the like downloaded from the camera body 200.

The lens CPU 120 controls each part of the lens unit 100 by following a control program stored in the ROM 124 or the flash ROM 126, with the RAM 122 taken as a work area.

With the lens mount 160 mounted on the body mount 260 of the camera body 200, the lens communicating part 150 communicates with the camera body 200 via a plurality of signal terminals (lens-side signal terminal), which will be described further below, provided on the lens mount 160.

The camera body 200 includes an image pickup device (MOS type or CCD type) 201, an image-pickup-device control part 202, an analog signal processing part 203, an A/D converter 204, an image input controller 205, a digital signal processing part 206, a RAM 207, a compression/decompression processing part 208, a media control part 210, a memory card 212, a display control part 214, a monitor 216, a body CPU 220 (body control part), an operating part 222, a timepiece part 224, a flash ROM 226, a ROM 228, an AF detecting part 230, an AE/AWB detecting part 232, a power supply control part 240, a battery 242 (power supply), a flash control part 246, a body communicating part 250 (lens-side communicating part), and the body mount 260 (body-side mount part).

The image pickup device 201 is configured of an image sensor for photographing a subject. An optical image of the subject formed by the photographing optical system 102 of the lens unit 100 on a light-receiving surface of the image pickup device 201 is converted by the image pickup device 201 to an electrical signal. Examples of the image pickup device 201 include a MOS (Meta Oxide Semiconductor)-type image sensor and a CCD (Charge Coupled Device)-type image sensor.

The image-pickup-device control part 202 controls photographing timing of the image pickup device 201, exposure time, and others by following an instruction from the body CPU 220.

The analog signal processing part 203 performs various analog signal processes on an analog image signal obtained by photographing a subject with the image pickup device 201. The analog signal processing part 203 of this example is configured to include a sampling hold circuit, a color separation circuit, a gain adjustment circuit, and others.

The A/D converter 204 converts the analog image signal outputted from the analog signal processing part 203 to a digital image signal.

The image input controller 205 temporarily stores the digital image signal outputted from the A/D converter 204 in the RAM 207 as image data. Note that when the image pickup device 201 is a MOS-type image pickup device, the A/D converter 204 is usually incorporated in the image pickup device 201.

The digital signal processing part 206 performs various digital signal processes on image data stored in the RAM 207. The digital signal processing part 206 of this example is configured to include a luminance and color-difference signal generation circuit, a gamma correction circuit, a sharpness correction circuit, a contrast correction circuit, a white balance correction circuit, and others.

The compression/decompression processing part 208 performs a compression process on non-compressed image data stored in the RAM 207. Also, the compression/decompression processing part 208 performs a decompression process on compressed image data.

The media control part 210 performs control of recording the image data compressed by the compression/decompression processing part 208 in the memory card 212. Also, the media control part 210 performs control of reading compressed image data from the memory card 212.

The display control part 214 performs control of causing non-compressed data stored in the RAM 207 to be displayed on the monitor 216.

The monitor 216 is configured of a display device such as, for example, a liquid-crystal display device or an organic EL display device.

When a live view image is displayed on the monitor 216, digital image signals successively generated by the digital signal processing part 206 are temporarily stored in the RAM 207. The display control part 214 converts the digital image signals temporarily stored in the RAM 207 to a signal format for display, and sequentially outputs the resultant signals to the monitor 216. With this, the photographing image is displayed on the monitor 216 in a real time manner, and photographing as using the monitor 216 as an electronic view finder can be performed.

When photographing of a subject and recording of a subject image are performed, the release button 22 is pressed halfway down, thereby performing AE control and AF control under the control of the body CPU 220, and photographing is performed with a full press. The image obtained by photographing is compressed in a predetermined compression format (for example, JPEG format) by the compression/decompression processing part 208. The compressed image data is provided with a necessary accessory information such as an photographing date and time and photographing conditions to be formed as an image file, and is then stored in the memory card 212 via the media control part 210.

The body CPU 220 performs centralized control over the operation of the entire camera 10. Also, the body CPU 220 forms a mount determining part which determines whether the lens unit 100 is mounted on the body mount 260. A lens mount determining process by the body CPU 220 will be described in detail further below.

The operating part 222 is configured to include the release button 22, the power supply switch 24, and the dial 26 depicted in FIG. 1. The body CPU 220 controls each part of the camera 10 based on an input from the operating unit 222 or the like.

The timepiece part 224 measures time as a timer based on an instruction from the body CPU 220. Also, the timepiece part 224 measures current year, month, day, and time as a calendar.

The flash ROM 226 is a readable and writable non-volatile memory, and stores setting information.

In the ROM 228, the control program to be executed by the body CPU 220 and various data required for control are recorded. The body CPU 220 controls each part of the camera 10 by following the control program stored in the ROM 228, with the RAM 207 taken as a work area.

The AF detecting part 230 calculates a numerical value required for AF (auto focus) control based on a digital image signal. In the case of so-called contrast AF, for example, an integrated value (focus evaluation value) of high-frequency components of G signal in a predetermined AF area is calculated. The body CPU 220 moves the focus lens 106 to a position where the focus evaluation value is maximum. Note that AF is not restricted to contrast AF. For example, AF of a phase-difference type may be performed.

The AE/AWB detecting part 232 calculates a numerical value required from AE (auto exposure) control and AWB (auto white balance) control based on a digital image signal. The body CPU 220 calculates brightness (subject luminance) of the subject based on the numerical value obtained from the AE/AWB detecting part 232, and determines an iris value and a shutter speed from a predetermined program diagram.

The power supply control part 240 provides each part of the camera body 200 with a power supply voltage supplied from the battery 242 by following an instruction from the body CPU 220. Also, the power supply control part 240 provides each part of the lens unit 100 with a power supply voltage supplied from the battery 242 via the body mount 260 and the lens mount 160.

The lens power supply switch 244 switches between ON/OFF and the level of a power supply voltage to be supplied to the lens unit 100 via the body mount 260 and the lens mount 160 by following an instruction from the body CPU 220.

The flash control part 246 controls light emission of the flash 20 by following an instruction from the body CPU 220.

The body communicating part 250 performs signal transmission and reception (communications) between the body mount 260 and the lens communicating part 150 of the lens unit 100 connected via the lens mount 160 by following an instruction from the body CPU 220. On the other hand, by following an instruction from the lens CPU 120, the lens communicating part 150 performs signal transmission and reception (communications) between the lens mount 160 and the body communicating part 250 of the camera body 200 connected via the body mount 260.

[Embodiment of Mount Part]

Figure 3:
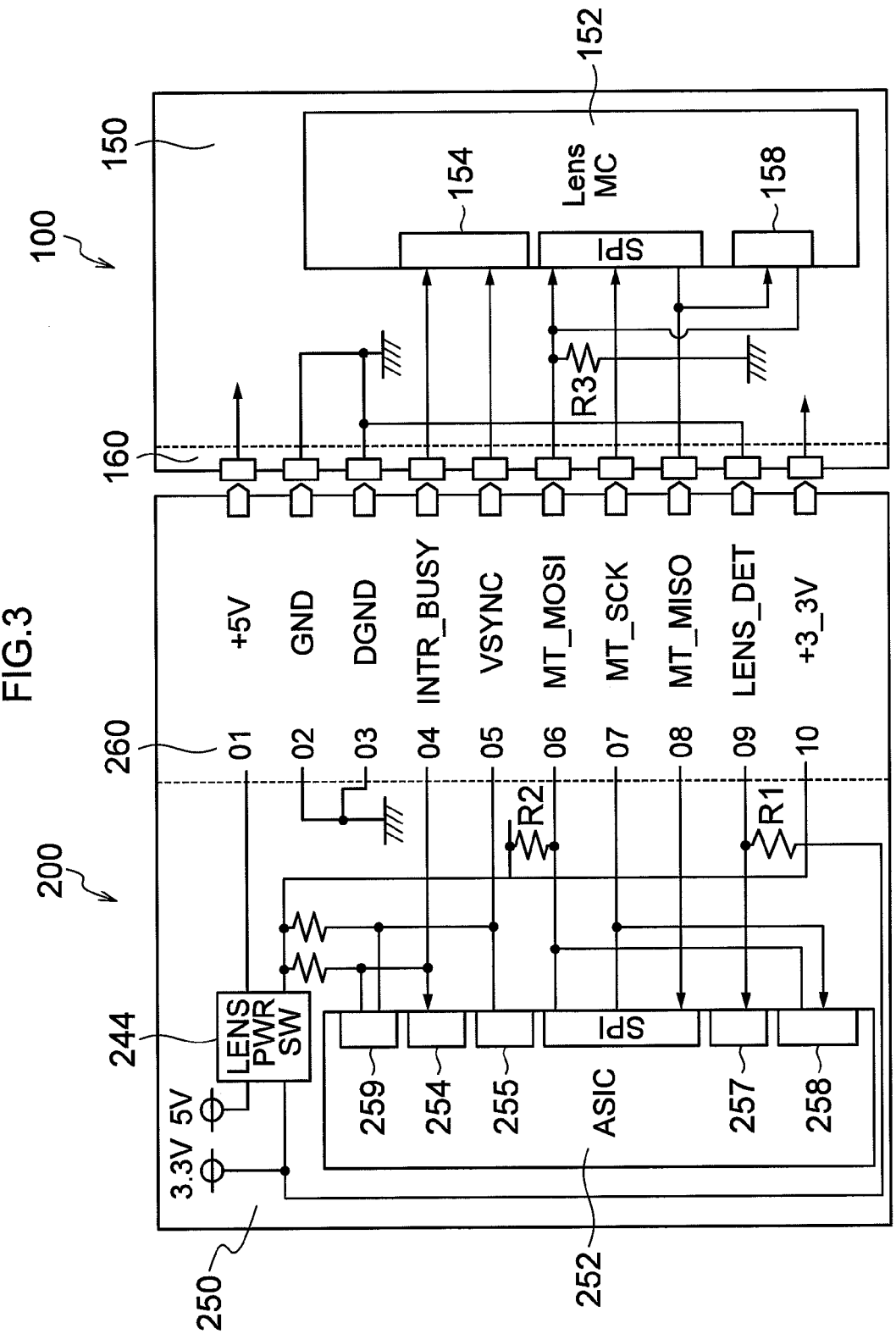
FIG. 3 is a descriptive diagram of a body mount (body-side mount part), a lens mount (lens-side mount part), and their peripheral parts.

FIG. 3 depicts the body mount 260, the lens mount 160, and their peripheral parts. With the lens mount 160 mounted on the body mount 260, the plurality of terminals (in this example, a number "01" to a number "10" of FIG. 3) of the body mount 260 respectively abut on the plurality of terminals of the lens mount 160.

A first terminal (+5 V terminal) of the body mount 260 is a first body-side power supply terminal for providing a voltage of +5 V of the battery 242 from the camera body 200 to the lens unit 100. A first terminal (+5 V terminal) of the body mount 260 is connected to the power supply control part 240 and the battery 242 via the lens power supply switch 244.

A second terminal (GND terminal) and a third terminal (DGND terminal) of the body mount 260 are body-side ground terminals for providing 0 V (ground voltage) from the camera body 200 to the lens unit 100. The second terminal and the third terminal are connected to the ground of the camera body 200.

A fourth terminal to an eighth terminal of the body mount 260 are a plurality of body-side signal terminals for transmitting and receiving a signal to and from the lens unit 100.

The fourth terminal (INTR_BUSY signal terminal) of the body mount 260 is a body-side busy signal terminal for notifying the camera body 200 from the lens unit 100 whether the lens unit 100 is during a period of a specific operation. By using this fourth terminal, the lens unit 100 may be notified from the camera body 200 of a specific operation period of the camera body 200. In this example, a High level (high potential) indicates that the relevant part is during a non-operation period and a Low level (low potential) indicates that the relevant part is during operation (in a busy state).

The fifth terminal (VSYNC signal terminal) of the body mount 260 is a body-side signal terminal for synchronization between the camera body 200 and the lens unit 100.

The sixth terminal (MT_MOSI signal terminal), the seventh terminal (MT_SCK signal terminal), and the eighth terminal (MT_SIMO signal terminal) of the body mount 260 are body-side communication signal terminals for serial communications between the camera body 200 and the lens unit 100. A MT_MOSI signal is a signal outputted from the camera body 200 as a master and inputted to the lens unit 100 as a slave. A MT_SCK signal is a clock signal provided from the camera body 200 as a master to the lens unit 100 as a slave. The MT_SIMO signal is a signal outputted from the lens unit 100 as a slave and inputted to the camera body 200 as a master.

A ninth terminal (LENS_DET terminal) of the body mount 260 is a body-side terminal dedicated for detection of the lens unit 100. In this example, a High level (high potential) indicates that the LENS_DET terminal of the body mount 260 and the LENS_DET terminal of the lens mount 160 are in a non-abutting state (non-mount state), and a Low level (low potential) indicates that the LENS_DET terminal of the body mount 260 and the LENS_DET terminal of the lens mount 160 are in an abutting state (mount state).

A tenth terminal (+3.3 V terminal) of the body mount 260 is a second body-side power supply terminal for providing a voltage of +3.3 V of the battery 242 from the camera body 200 to the lens unit 100.

The ninth terminal (LENS_DET terminal) of the body mount 260 is connected to the power supply control unit 240 and the battery 242 via a first pull-up resistor R1. Also, among the plurality of signal terminals for signal transmission and reception (communications) of the body mount 260 (the fourth terminal to the eighth terminals), the sixth terminal (MT_MOSI signal terminal) is connected to the battery 242 via a second pull-up resistor R2 and the lens power supply switch 244. In this example, the first pull-up resistor R1 and the second pull-up resistor R2 have a resistance value of 220 k ohm.

The second pull-up resistor R2 is connected to the lens power supply switch 244. With the lens power supply switch 244 turned OFF (in a non-powered-up state of the lens unit 100), the sixth terminal (MT_MOSI signal terminal) is not pulled up. With the lens power supply switch 244 turned ON by the body CPU 220 (in a powered-up state of the lens unit 100), the sixth terminal (MT_MOSI signal terminal) is pulled up. That is, the voltage of the sixth terminal (MT_MOSI signal terminal) of the lens unit 100 does not become at a high level only with the power supply switch 24 of the camera body 200 turned ON, and it was not until the lens power supply switch 244 is turned ON by the body CPU 220 that the voltage of the sixth terminal (MT_MOSI signal terminal) of the lens unit 100 becomes at a high level. With this, an erroneous operation of a Lens MC 152 (integrated circuit) on a lens unit 100 side can be prevented.

Prior to pre-power-up of the lens unit 100 via a body-side power supply terminal of the body mount 260, the body CPU 220 (mount determining part) of the camera body 200 takes only the ninth terminal (LENS_DET terminal) as a determination target, and determines whether the ninth terminal (LENS_DET terminal) is at a low level. When a determination is made such that the ninth terminal (LENS_DET terminal) is at a low level, after pre-power-up of the lens unit via the body-side power supply terminal of the body mount 260, the body CPU 220 determines whether the LENS_DET terminal and the sixth terminal (MT_MOSI signal terminal) at non-communications are both at a low level.

The ninth terminal (LENS_DET terminal) of the lens mount 160 is connected to the ground (the GND terminal and the DGND terminal). Also, among the plurality of signal terminals (the fourth terminal to the eighth terminal) of the lens mount 160, the sixth terminal (MT_MOSI signal terminal) is connected to the ground via a pull-down resistor R3 (in this example, 47 k ohm), which has a resistance value sufficiently small with respect to the pull-up resistor R2.

The body CPU 220 makes, as the mount determining part, a determination as to whether the lens mount 160 is mounted on the body mount 260 (that is, a determination as to whether the lens unit 100 is mounted on the camera body 200) based on the voltage (High/Low level) of the ninth terminal (LENS_DET terminal) of the body mount 260 and the voltage (High/Low level) of a specific body-side signal terminal (in this example, the MT_MOSI signal terminal) at non-communications. Specifically, the body CPU 220 determines that the lens unit 100 is mounted on the body mount 260 when the voltage of the LENS_DET terminal of the camera body 200 and the voltage of the MT_MOSI signal terminal at non-communications are both at a low level.

Also, by the lens CPU 120, a determination as to whether the lens mount 160 is mounted on the body mount 260 (that is, a determination as to whether the lens unit 100 is mounted on the camera body 200) may be made based on the voltage (High/Low level) of the ninth terminal (LENS_DET terminal) of the lens mount 160 and the voltage (High/Low level) of a specific lens-side signal terminal (in this example, the MT_MOSI signal terminal) at non-communications. Specifically, the lens CPU 120 determines that the lens unit 100 is mounted on the body mount 260 when the voltage of the LENS_DET terminal of the lens unit 100 and the voltage of the MT_MOSI signal terminal at non-communications are both at a low level.

In the embodiment depicted in FIG. 3, one or more signal terminals are placed between the MT_MOSI signal terminal of the body mount 260 (the specific body-side signal terminal) and each of the power supply terminals (the +5 V terminal and the +3.3 V terminal). Also, one or more signal terminals are placed between the MT_MOSI signal terminal of the body mount 260 (the specific body-side signal terminal) and the ground terminals GND and DGND. Furthermore, one or more signal terminals are placed between the MT_MOSI signal terminal of the body mount 260 (the specific body-side signal terminal) and the LENS_DET terminal dedicated for lens detection. As such, the MT_MOSI signal terminal for use in mount determination is placed at a position away from the power supply terminals, the ground terminals, and the terminal dedicated for lens detection, thereby preventing an erroneous detection due to electric short or the like and, furthermore, improving accuracy in mount determination.

An ASIC 252 (integrated circuit) configuring the body communicating part 250 has a terminal 254 for detecting a change (High/Low) in potential of the fourth terminal (hereinafter also referred to as an "INTR_BUSY signal terminal" or a "busy signal terminal") of the body mount 260, a terminal 255 for providing a synchronous signal to the fifth terminal (VSYNC signal terminal) of the body mount 260, an interface SPI for serial communications using the sixth to eighth terminals (hereinafter referred to as "communication signal terminals") of the body mount 260, a terminal 257 for detecting a change (High/Low) in potential of the ninth terminal (LENS_DET terminal) of the body mount 260, and terminals 258 and 259 for updating firmware of the lens unit 100.

The Lens MC 152 (integrated circuit) configuring the lens communicating part 150 has a terminal 154 for detecting a change (High/Low) in potential of the fourth terminal (INTR_BUSY signal terminal) of the lens mount 160, an interface SPI for serial communications using the sixth to eighth terminals (communication signal terminals) on the lens side of the lens mount 160, and a terminal 158 for updating firmware of the lens unit 100.

[Example of Busy Signal Control Process]

Figure 4:
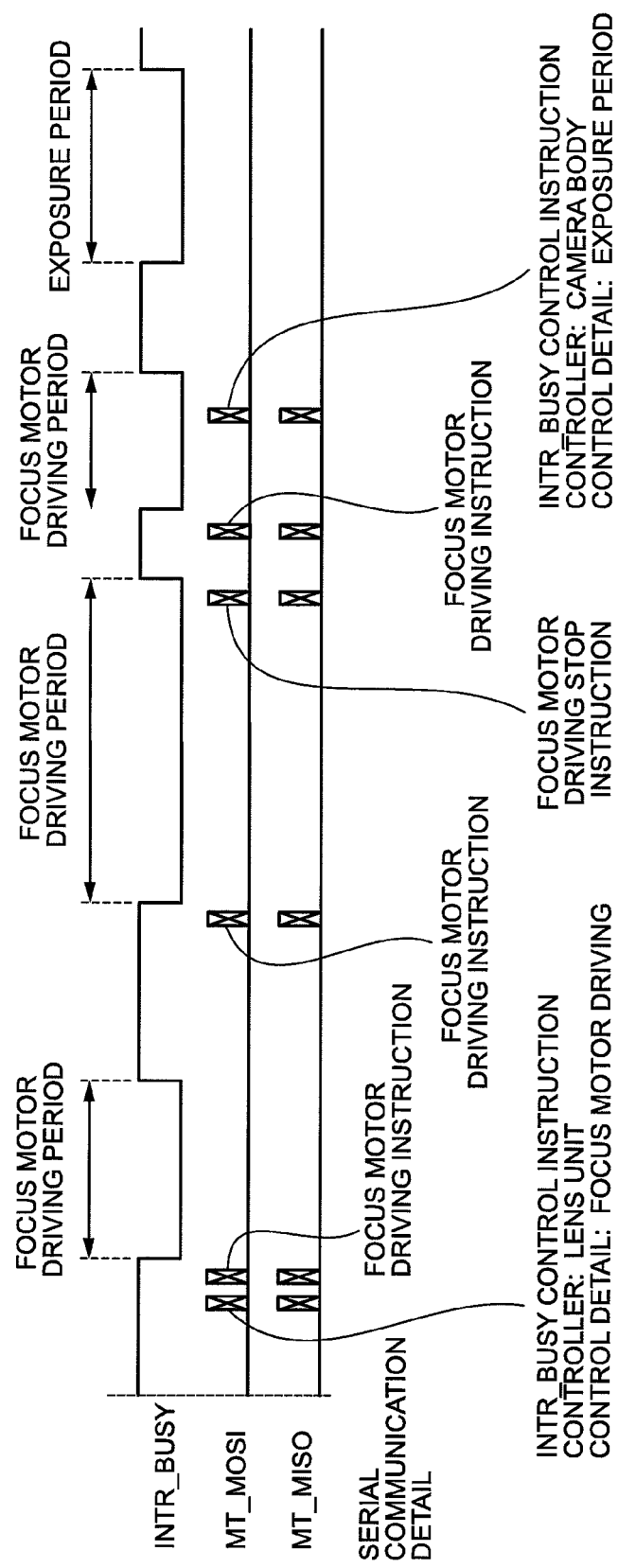
FIG. 4 is a timing chart of an example of a busy signal control process.

FIG. 4 is a timing chart of an example of change in voltage level of each terminal of the body mount 260 and the lens mount 160.

First, from the body communicating part 250 to the lens communicating part 150, a first INTR_BUSY control instruction (controller: lens unit, control detail: focus motor driving) is transmitted via the MT_MOSI signal terminal. With the first INTR_BUSY control instruction, "controller" as a subject which controls the signal level of the INTR_BUSY signal is specified as the lens unit 100, and "control detail" as a notification target by the busy signal is specified as focus motor driving. Upon receiving the instruction, the lens communicating part 150 returns a response to the body communicating part 250 via the MT_MISO signal terminal.

Next, from the body communicating part 250 to the lens communicating part 150, a first focus motor driving instruction is transmitted via the MT_MOSI signal terminal. For example, the instruction is such that the focus lens is moved to a ×1 pulse position. Upon receiving the instruction, the lens communicating part 150 returns a response to the body communicating part 250 via the MT_MISO signal terminal.

The lens communicating part 150 sets the INTR_BUSY signal to a Low level (an ON state) while the focus lens is moved by the focus motor of the focus lens control part 116 (during a focus motor driving period). Also, when driving ends, the lens communicating part 150 sets the INTR_BUSY signal to a High level (an OFF state).

Next, from the body communicating part 250 to the lens communicating part 150, a second focus motor driving instruction is transmitted via the MT_MOSI signal terminal. For example, the instruction is such that the focus lens is moved to a ×2 pulse position. Upon receiving the instruction, the lens communicating part 150 returns a response to the body communicating part 250 via the MT_MISO signal terminal.

The lens communicating part 150 sets the INTR_BUSY signal at a Low level (an ON state) during the focus motor driving period. Also, when driving ends, the lens communicating part 150 sets the INTR_BUSY signal at a High level (an OFF state).

Note in this example that a focus motor driving stop instruction is transmitted from the body communicating part 250 to the lens communicating part 150 via the MT_MOSI signal terminal. Upon receiving the instruction, the lens communicating part 150 returns a response to the body communicating part 250 via the MT_MISO signal terminal. In this example, at the time when driving of the focus motor stops, the lens communicating part 150 set the INTR_BUSY signal at a High level (an OFF state).

Next, from the body communicating part 250 to the lens communicating part 150, a third focus motor driving instruction is transmitted via the MT_MOSI signal terminal. For example, the instruction is such that the focus lens is moved to a ×3 pulse position. Upon receiving the instruction, the lens communicating part 150 returns a response to the body communicating part 250 via the MT_MISO signal terminal.

During the focus motor driving period, the lens communicating part 150 sets the INTR_BUSY signal at a Low level (in an ON state).

Also, from the lens communicating part 150 to the body communicating part 250, a second INTR_BUSY control instruction (controller: camera body, control detail: exposure period) is transmitted via the MT_MOSI signal terminal. With the second INTR_BUSY control instruction, the camera body 200 is specified as a "controller" as a subject which controls the signal level of the INTR_BUSY signal, and exposure is specified as a "control detail" as a notification target by a busy signal. Upon receiving the instruction, the body communicating part 250 returns a response to the lens communicating part 150 via the MT_MISO signal terminal.

The body communicating part 250 sets the INTR_BUSY signal at a Low level (an ON state) during an exposure period. Also, when driving ends, the body communicating part 250 sets the INTR_BUSY signal at a High level (an OFF state). In this example, notification about an exposure period with the release button 22 fully pressed with (an S2 switch turned ON) is made by the INTR_BUSY signal.

Note that the lens unit 100 has the zoom lens control part 114, the focus lens control part 116, and the iris control part 118 as driving parts which drive the zoom lens 104, the focus lens 106, and the iris 108, respectively. Also, the zoom lens control part 114, the focus lens control part 116, and the iris control part 118 have drive motors for changing the position of the zoom lens 104, the position of the focus lens 106, and the opening of the iris 108, respectively. The lens communicating part 150 sets the INTR_BUSY signal to an ON state during a drive period of the zoom lens 104 by the drive motor of the zoom lens control part 114, during a drive period of the focus lens 106 by the drive motor of the focus lens control part 116, and during a drive period of the iris 108 by the iris control part 118. However, the INTR_BUSY signal is set to an ON state only when the INTR_BUSY control signal indicates "control detail" (notification target of the busy signal). That is, the present invention is not restricted to make a notification that all of the focus lens 106, the zoom lens 104, and the iris 108 are being operated (busy), but may make a notification that at least one of the focus lens 106, the zoom lens 104, and the iris 108 is being operated.

Figure 5:
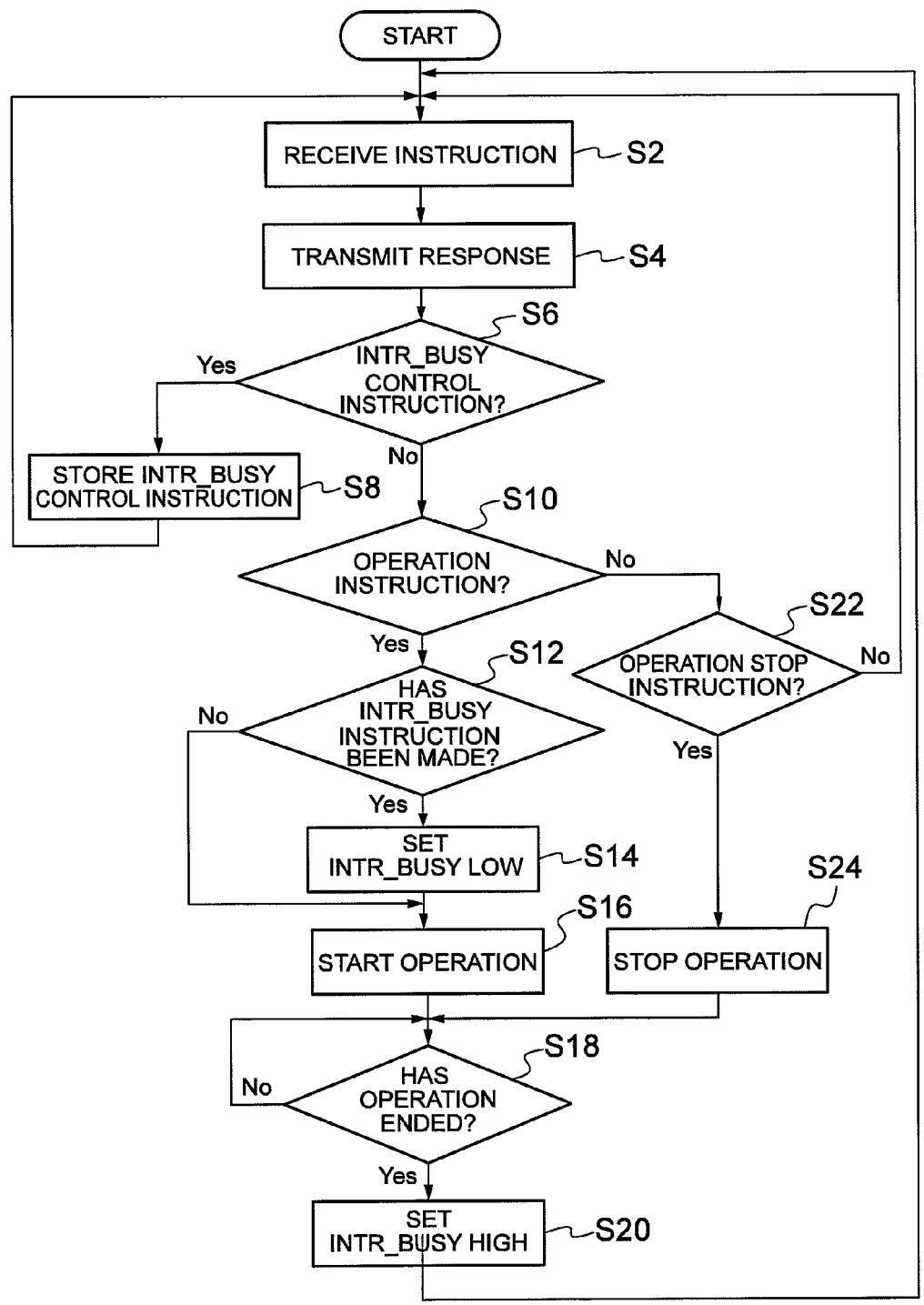
FIG. 5 is a flowchart of an example of the busy signal control process in a lens unit.

FIG. 5 is a flowchart depicting a flow of an example of the busy signal control process in the lens unit 100. The process is performed by the lens CPU 120 according to a program.

First, an instruction is received by the lens communicating part 150 from the body communicating part 250 via serial communications (step S2).

Next, a response to the instruction is transmitted by the lens communicating part 150 to the body communicating part 250 via serial communications (step S4).

Next, it is determined whether the received instruction is an INTR_BUSY signal control instruction (step S6).

When an INTR_BUSY signal control instruction is received, the INTR_BUSY signal control instruction is stored in the RAM 122 (step S8).

Also, it is determined whether the received instruction is an operation instruction (such as a focus motor driving instruction, a zoom motor driving instruction, or an iris motor driving instruction) (step S10).

When an operation instruction is received, it is further determined whether the operation is the one indicated by the INTR_BUSY signal control instruction (step S12). That is, it is determined whether the operation is included as "control detail" (notification target of the busy signal) in the INTR_BUSY signal stored in the RAM 122. When the operation is the one indicated by the INTR_BUSY signal control instruction, the INTR_BUSY signal is set at a Low level (an ON state) (step S14), the operation is started (such as focus motor driving, zoom motor driving, or iris motor driving) (step S16), and it is determined whether the operation ends (step S18). When the operation ends, the INTR_BUSY signal is set at a High level (an OFF state) (step S20).

In the present embodiment, the camera body 200 and the lens unit 100 each include a communicating part (the body communicating part 250 and the lens communicating part 150) which communicates via the communication signal terminals (the MT_MOSI signal terminal, the MT_MISO signal terminal, and the MT_SCK signal terminal) and the INTR_BUSY signal terminal (busy signal terminal). The body communicating part 250 transmits an INTR_BUSY signal control instruction which can indicate the type of operation executable at the lens unit 100 or the camera body 200 and indicating the type of the operation of the notification target of the INTR_BUSY signal to the lens unit 100. The lens communicating part 150 and the body communicating part 250 set the INTR_BUSY signal to an ON state only during a period of operation of the type indicated by the INTR_BUSY signal control instruction.

Also in the present embodiment, the lens communicating part 150 retains the "controller" and the "control detail" (type of operation as a notification target of the INTR_BUSY signal) of the INTR_BUSY signal control instruction in the RAM 122 (memory), and sets the INTR_BUSY signal to an ON state every time the operation of the type retained in the RAM 122 is performed, until another type of operation is indicated by the INTR_BUSY signal as a "control detail". However, the present invention is not restricted to this case. An instruction of the type of operation indicated by the INTR_BUSY signal control instruction can be cancelled by serial communications, and the INTR_BUSY signal may be set to an ON state every time the operation of the type retained in the RAM 122 is performed until the instruction of the type of operation indicated by the INTR_BUSY signal control instruction is cancelled.

Furthermore, while the example has been described in the present embodiment in which, when a plurality of types of operations are specified by the INTR_BUSY signal control instruction as a "control detail", the lens communicating part 150 sets the INTR_BUSY signal to a Low level (an ON state) at the time of starting each of the operations of the plurality of type and the INTR_BUSY signal is set to a High level (an OFF state) at the end of each of the operations of the plurality of types, the present invention is not restricted to this case. When a plurality of types of operations are specified by the INTR_BUSY signal control instruction as a "control detail", the lens communicating part 150 may set the INTR_BUSY signal to an ON state at the time of starting an initial operation among the plurality of types of operations, and may set the INTR_BUSY signal to an OFF state at the end of the entire operation.

Also at step S22, it is determined whether the instruction received from the camera body 200 is a stop instruction (such as focus motor driving stop instruction, zoom motor driving stop instruction, or iris motor driving stop instruction). If an operation stop instruction has been received, the operation is stopped (step S24). After the operation ends (Yes at step S18), the INTR_BUSY signal is set at a High level (an OFF state) (step S20). Note that while the process flow is depicted in FIG. 5 in which the end of the operation is waited for without receiving an instruction at step S18 for convenience of description, in practice, an instruction can be received also during operation.

[Example of Busy Signal Control when Camera Body Power Supply is Turned ON]

In the present embodiment, at the time of initial position driving in which a driven member (the zoom lens 104, the focus lens 106, or the iris 108) is driven by a driving part (the zoom lens control part 114, the focus lens control part 116, or the iris control part 118) which drives the photographing optical system 102 to an initially set position, with an INTR_BUSY signal control instruction and an instruction for driving a driven member not received, the lens communicating part 150 sets the INTR_BUSY signal at a Low level (an ON state) during a period of initial position driving, and sets the INTR_BUSY signal at a High level (an OFF state) at the end of initial position driving.

Figure 6:
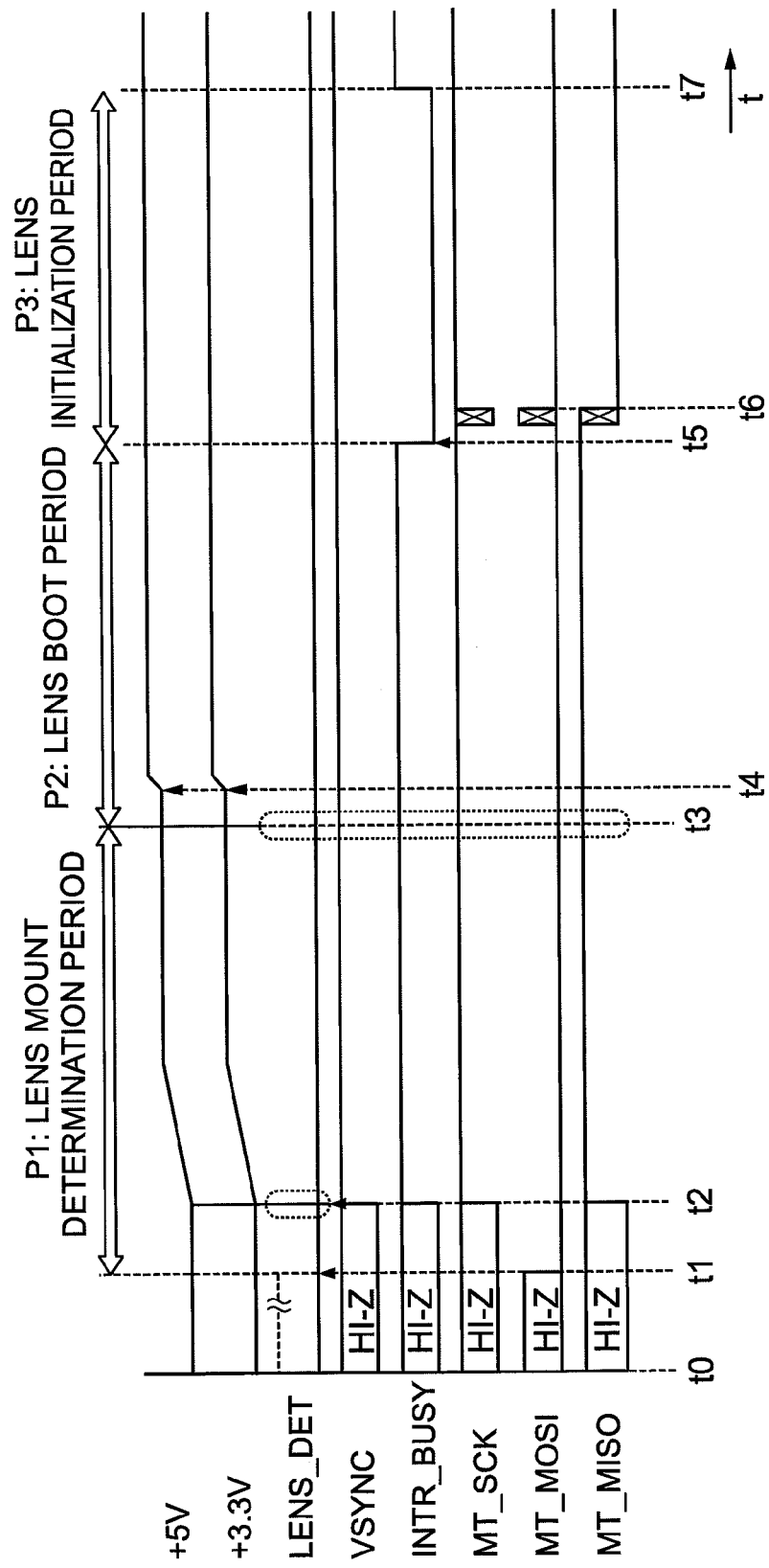

FIG. 6 is a timing chart of an example of change in voltage level of an ASIC 252 port corresponding to a voltage level of each terminal of the body mount 260. In a lens mount determination period P1 (t1 to t3) depicted in FIG. 6, the body CPU 220 performs a lens mount determining process. At t2 of P1, pre-power-up (soft start) is performed in which a microcurrent from the battery 242 is supplied via the body-side power supply terminal (+5 V terminal, +3.3 V terminal) to the lens unit 100 under the control of the body CPU 220. The microcurrent at pre-power-up is smaller than the current supplied to the lens unit 100 at full-power-up, which will be described further below (for example, several tens of mA). With pre-power-up, a capacitor (omitted in the drawings) provided on a lens unit 100 side is gradually provided with electric charge.

When it is determined that the lens unit 100 is mounted, pre-power-up is switched to full-power-up. That is, full-power-up is performed in which a current (for example, 1 A) from the battery 242 and allowing the lens unit 100 to operate is supplied to the lens unit 100 via the body-side power supply terminal (+5 V terminal, +3.3 V terminal) under the control of the body CPU 220.

Note that while the voltage of the body-side power supply terminal (+5 V terminal, +3.3 V terminal) is represented at two stages for convenience in order to make pre-power-up (staring at t2) and full-power-up (starting at t4) visually understood with ease in FIG. 6, in practice, a target voltage at which pre-power-up reaches with microcurrent is equal to the voltage (+5 V, 3.3 V) at full-power-up.

At full-power-up, the process makes a transition to a lens boot period P2 (t3 to t5). When a system boot of the lens unit 100 is completed, a lens initialization period P3 (t5 to t7) starts. With a full power supply voltage (+5 V, 3.3 V) supplied to the lens unit 100 via the body-side power supply terminal (+5 V terminal, +3.3 V terminal), communications with the lens unit 100 are performed via the signal terminal (the MT_SCK signal terminal, the MT_MOSI signal terminal, MT_MISO signal terminal, the INTR_BUSY signal terminal, and the VSYNC signal terminal).

Figure 7:
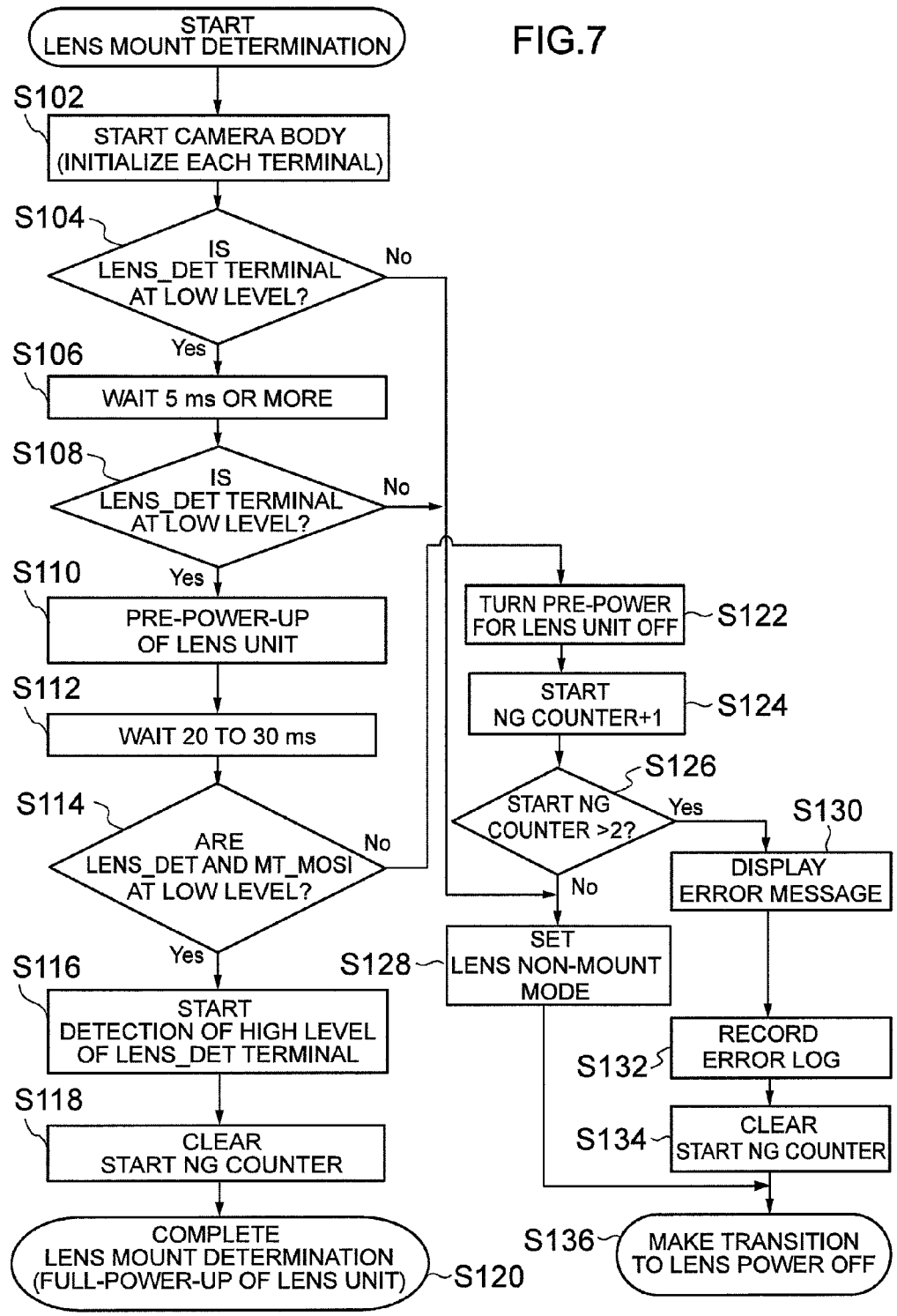
FIG. 7 is a flowchart of an example of the busy signal control process in a camera body.

FIG. 7 is a flowchart of an example of the lens mount determining process when the camera body 200 is powered ON. This lens mount determining process is performed by the body CPU 220 of the camera body 200 by following a program. In the following, one example of the lens mount determining process when the camera body 200 is powered ON is described by using FIG. 7.

When the camera body 200 is powered ON by the power supply switch 24 (t0 of FIG. 6), the body CPU 220 performs a process of starting the camera body 200 (step S102). At step S102, the body CPU 220 initially sets each terminal of the body mount 260. The body CPU 220 of this example turns the lens power supply switch 244 OFF (pre-power-off and full-power-off) and, at the same time, sets the ASIC 252 port corresponding to each of the INTR_BUSY signal terminal, the VSYNC signal terminal, the MT_SCK signal terminal, the MT_MOSI signal terminal, MT_MISO signal terminal of the body mount 260 to high impedance (Hi-Z).

Note that when the lens mount 160 is not mounted on the body mount 260, the voltage of the LENS_DET terminal of the body mount 260 is set at a High level by the first pull-up resistor R1 of the camera body 200. When the lens mount 160 is mounted on the body mount 260, the voltage of the LENS_DET terminal of the body mount 260 is set at a Low level, with conduction to the ground via the terminal of the lens unit 100.

Note that when the lens unit 100 is powered up with the lens mount 160 not mounted on the body mount 260, the voltage of the MT_MOSI signal terminal of the body mount 260 is set at a High level by the second pull-up resistor R2 of the camera body 200. When the lens mount 160 is mounted on the body mount 260, the MT_MOSI signal terminal of the body mount 260 is set at a Low level by the pull-down resistor R3 of the lens unit 100 having a resistance value sufficiently smaller than that of the pull-up resistor R2.

At t1 of FIG. 6, the body CPU 220 determines whether the LENS_DET terminal of the body mount 260 is at a Low level (step S104). When the LENS_DET terminal is at a Low level, the body CPU 220 waits 5 ms or more by using the timepiece part 224 as a wait for chattering to become statically determinate (step S106), and then again determine whether the LENS_DET terminal of the body mount 260 is at a Low level (step S108).

When Yes is determined at step S104 and step S108 (that is, the LENS_DET terminal is at a Low level for 5 ms or more), the body CPU 220 performs pre-power-up by the lens power supply switch 244 at t2 of FIG. 6 (step S110). With pre-power-up, the power supply voltage is increased to a voltage level allowing a polarity determination of all signal terminal to be made when the lens is mounted. Also, the ASIC 252 port corresponding to each of the INTR_BUSY signal terminal, the VSYNC signal terminal, the MT_SCK signal terminal, and the MT_MISO signal terminal of the body mount 260 is at a High level.

After pre-power-up, the body CPU 220 waits for 20 ms to 30 ms by using the timepiece part 224 in order to establish the voltage levels of the signal terminals (step S112).

At t3 of FIG. 6, the body CPU 220 determines whether the LENS_DET terminal and the MT_MOSI signal terminal of the body mount 260 are simultaneously at a Low level (step S114). The body CPU 220 in this example makes a level determination on the LENS_DET terminal and the MT_MOSI signal terminal and simultaneously checks whether the INTR_BUSY signal terminal, the VSYNC signal terminal, the MT_SCK signal terminal, and the MT_MISO signal terminal are at a High level.

When the LENS_DET terminal and the MT_ MOSI signal terminal are both at a Low level, it is determined that the lens unit 100 is mounted, and the process proceeds to step S116. When at least one terminal of the LENS_DET terminal and the MT_MOSI signal terminal is at a High level, it is determined that the lens unit 100 is not mounted, and the process proceeds to step S122.

When it is determined at step S114 that the lens is not mounted, the body CPU 220 starts detection of a High level edge (an edge of switching from a Low level to a High level) of the LENS_DET terminal (step S116). The body CPU 220 of this example enables an interrupt for detecting a High level edge of the LENS_DET terminal by ASIC 252.

Next, the body CPU 220 clears a start NG counter (step S118). With this, the lens mount determining process is completed.

When the lens mount determining process is completed, the body CPU 220 starts a lens boot process, fully powering up the lens unit 100 by the lens power supply switch 244 (step S120, t4 of FIG. 6). With full-power-up, a current amount allowing various signal processes and a lens operation by the lens unit 100 is ensured.

Also, the body CPU 220 performs settings of each signal terminal at the time of communications. Specifically, an interrupt for detecting a Low level edge (an edge of switching from a High level to a Low level) of the INTR_BUSY signal is enabled, VSYNC signal output settings are made, and initial settings of the interface SPI for ASIC 252 serial communications are made.

In the lens boot period P2, the lens unit 100 is started (lens system boot), allowing initial position driving of the driven member of the photographing optical system 102. When the lens boot period P2 ends, initial position driving is started by the lens CPU 120 in which the driven member (such as the zoom lens 104, the focus lens 106, or the like of FIG. 2) of the lens unit 100 is moved to an initially set position (t5 of FIG. 6). The lens communicating part 150 switches the INTR_BUSY signal from a High level to a Low level (an ON state: indicating that now is during an operation period).

Next, the process when it is detected that the lens unit 100 is not mounted at the time of power-on of the camera body 200 is described.

When determining at step S104 or S108 that the LENS_DET terminal is at a Low level (low potential), the body CPU 220 changes the operation mode to a lens non-mount mode (step S128), and makes a transition to a sequence during lens powered-OFF (step S136).

Also, when determining at step S114 that the lens unit 100 is not mounted, the body CPU 220 turns the lens power supply switch 244 OFF, thereby turning pre-power for the lens unit 100 OFF (step S122).

Next, the body CPU 220 increments the start NG counter (step S124), and determines whether the start NG counter has a value exceeding a threshold (in this example, "2") (step S126).

When the start NG counter has a value equal to or smaller than the threshold, the body CPU 220 changes the operation mode to a lens non-mount mode, (step S128), and makes a transition to the sequence during lens powered-OFF (step S134).

When the start NG counter has a value exceeding the threshold, the body CPU 220 outputs an error message to the monitor 216 via the display control part 214 (step S130), records an error log in the flash ROM 226 (step S132), clears the start NG counter (step S134), and then makes a transition to the sequence during lens powered-OFF (step S136).

As an error message, for example, "please check the lens" is displayed. The error message output may be performed as a voice output. As an error log, for example, "lens boot start timeout error" is recorded.

Next, initial position driving of the lens unit 100 performed by the body CPU 220 in the lens initialization period P3 of FIG. 6 is described.

In the present embodiment, to increase the speed for starting the lens unit 100, initial position driving of the lens unit 100 is automatically performed simultaneously with the end of the lens boot period P2. In this initial position driving, the INTR_BUSY signal control instruction, which is used at normal time, is not used, and, as initial settings, the lens unit 100 is assigned as "controller" and "initial position driving" is assigned as "control detail". Thus, the body communicating part 250 which monitors the INTR_BUSY signal enables an interrupt for detecting a Low level edge of the INTR_BUSY signal at the time of full-power-up of the lens unit 100 as described above. The body CPU 220 regards detection of a Low level edge of the INTR_BUSY signal as completion of lens boot and start of initial position driving of the lens unit 100.

Also, a Low level edge of the INTR_BUSY signal may not occur due to a failure of the lens unit 100 or the like. Thus, time control is started simultaneously with full-power-up of the lens unit 100 (t4 of FIG. 6).

The body CPU 220 uses the timer of the timepiece part 224 to monitor the presence or absence of an interrupt of a Low level edge of the INTR_BUSY signal. If the INTR_BUSY signal is not switched from a High level to a Low level due to a failure of the lens unit 100 or the like even though a predetermined time (for example, 200 ms) elapses from full-power-ON, the body communicating part 250 turns the lens power supply switch 244 OFF, stops full power supply to the +5 V power supply terminal and the 3.3 V power supply terminal of the body mount 260, and records an error log in the flash ROM 226 as a lens system boot timeout error.

Also, with the busy signal control instruction and the driving instruction not received from the camera body 200, as initial position driving of the lens unit 100, the lens CPU 120 uses the driving parts (the zoom lens control part 114, the focus lens control part 116, and the iris control part 118) to drive the driven members (the zoom lens 104, the focus lens 106, and the iris 108) at respective initial setting positions. The lens communicating part 150 sets the INTR_BUSY signal at a Low level (an ON state) during a period of initial position driving, and sets the INTR_BUSY signal at a High level (an OFF state) at the end of initial position driving (t7 of FIG. 6). With this, the body CPU 220 of the camera body 200 detects, by an interrupt, a High level edge (a change from a Low level to a High level) of the INTR_BUSY signal. Note that the body CPU 220 enables an interrupt for detecting a High level edge of the INTR_BUSY signal at the start of the lens initialization period P3 where a Low level edge of the INTR_BUSY signal is detected.

When a Low edge (a change from a High level to a Low level) of the INTR_BUSY signal is detected by an interrupt in a predetermined period from full-power-up, the body communicating part 250 transmits an NOP command by the MT_MOSI signal for serial communications to the lens communicating part 150. The lens communicating part 150 receiving this NOP command transmits an NOP response by the MT_MISO signal for serial communications to the body communicating part 250. When this NOP response indicates "OK", a lens ID and a serial number are obtained by the body communicating part 250 and further by serial communications with the lens communicating part 150. When the NOP response indicates "NG", the body communicating part 250 assumes a communication error, and performs a communication error recovery process.

In the foregoing, while the case has been described as an example in which the interchangeable lens camera is an interchangeable lens camera (mirrorless single-lens reflex camera) with a reflective mirror omitted therefrom, the present invention can be applied also to an interchangeable lens camera including a reflective mirror. Also, the case has been described as an example in which an image pickup device is provided to the camera body, the present invention can be applied also to the case in which an image pickup device is provided to the lens unit.

Also, by way of example, FIG. 4 depicts only the case in which the INTR_BUSY signal (busy signal) and the INTR_BUSY signal control instruction notify that the operation is during a focus motor driving period and an exposure period. However, the present invention is not particularly restricted by this case. The INTR_BUSY signal control instruction can indicate, as appropriate, an operation required to be monitored among all operations of the lens unit 100 and the camera body 200 to control the signal level of the INTR_BUSY signal.

It goes without saying that the present invention is not restricted to the examples described in the specification and the examples depicted in the drawings and various design changes and improvements can be made in a range not deviating from the gist of the present invention.

What is claimed is:

1. A lens unit attachable to and detachable from a camera body, comprising:
   a communication signal terminal for communicating with the camera body, a busy signal terminal for a busy signal indicating whether the lens unit is during a period of an operation; and
   a communicating part for communicating with the camera body via the communication signal terminal and the busy signal terminal, wherein
   the communicating part receives a busy signal control instruction which is capable of indicating a type of an operation that can be performed at the lens unit via the communication signal terminal, and sets the busy signal to an ON state during the operation of the type indicated by the busy signal control instruction.

2. The lens unit according to claim 1, wherein
   upon receiving the busy signal control instruction, the communicating part retains the type of the operation indicated by the busy signal control instruction in a memory, and sets the busy signal to the ON state every time the operation of the type retained in the memory is performed during the operation of the type indicated by the busy signal control instruction and every time the operation of the type retained in the memory is performed.

3. The lens unit according to claim 1, further comprising a driven member and a driving part which drives the driven member, wherein
   at initial position driving of driving the driven member by the driving part to an initial position, with the busy signal control instruction not received from the camera body, the communicating part sets the busy signal to an ON state during a period of the initial position driving, and sets the busy signal to an OFF state when the initial position driving ends.

4. The lens unit according to claim 1, wherein
   every time the operation of the type retained in the memory is performed, the communicating unit sets the busy signal corresponding to the operation of the type retained in the memory to an ON state until an operation of another type is indicated by the busy signal control instruction or until an instruction of the type of the operation indicated by the busy signal control instruction is cancelled.

5. The lens unit according to claim 1, wherein
   when operations of a plurality of types are specified by the busy signal control instruction, the communicating part sets the busy signal to an ON state when each of the operations of the plurality of types is started and sets the busy signal to an OFF state when each of the operations of the plurality of types ends.

6. The lens unit according to claim 1, wherein
   when operations of a plurality of types are specified by the busy signal control instruction, the communicating part sets the busy signal to an ON state when a first operation among the operations of the plurality of types is started and sets the busy signal to an OFF state when all of the operations end.

7. The lens unit according to claim 1, further comprising driving parts which drive a zoom lens, a focus lens, and an iris, and
   the communication part sets the busy signal to an ON state during a period of driving by any of the driving parts.

8. A lens unit attachable to and detachable from a camera body, comprising:
   a communication signal terminal for communicating with the camera body, a busy signal terminal for a busy signal indicating whether the lens unit is during a period of an operation, and a communicating part for communicating with the camera body via the communication signal terminal and the busy signal terminal, wherein
   upon receiving a busy signal control instruction which is an instruction from the camera body and indicates a type of an operation of a notification target of the busy signal among operations that can be performed at the lens unit, via the communication signal terminal, the communicating part retains the type of the operation indicated by the busy signal control instruction in a memory, and sets the busy signal corresponding to the operation of the type retained in the memory to an ON state every time the operation of the type retained in the memory is performed during the operation of the type indicated by the busy signal control instruction.

9. The lens unit according to claim 1, further comprising a ground terminal which is connected to a ground of the camera body, wherein the busy signal terminal and the ground terminal are arranged next to each other.

10. The lens unit according to claim 1, wherein the type of the operation includes exposure.

* * * * *